(No Model.)
T. N. HACKET.
SAW ARBOR.
No. 271,840. Patented Feb. 6, 1883.
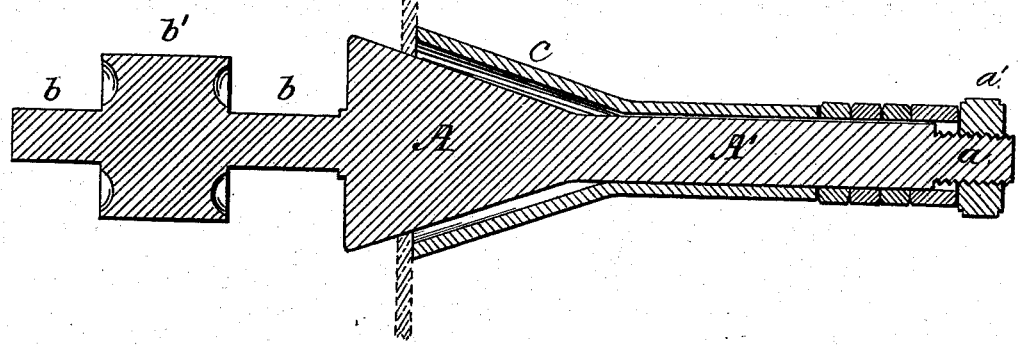
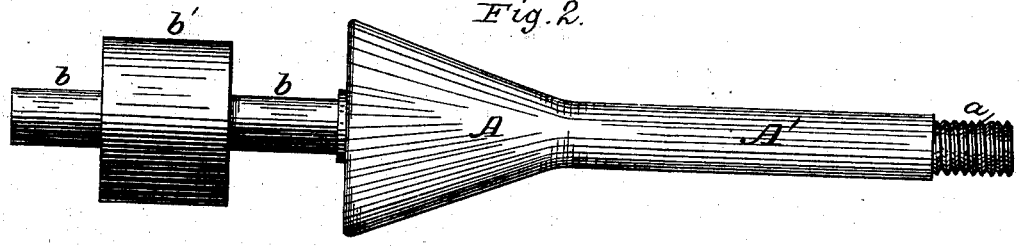
Witnesses:
C. M. Johnson
W. S. Masson
Inventor:
T. N. Hacket
By
Attorney.

UNITED STATES PATENT OFFICE.

THEODORE N. HACKET, OF EMPORIUM, PENNSYLVANIA.

SAW-ARBOR.

SPECIFICATION forming part of Letters Patent No. 271,840, dated February 6, 1883.

Application filed September 28, 1882. (No model.)

*To all whom it may concern:*

Be it known that I, THEODORE N. HACKET, a citizen of the United States of America, residing at Emporium, in the county of Cameron and State of Pennsylvania, have invented certain new and useful Improvements in Saw-Arbors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in saw-clamps, and it is intended to provide a cheap and effective means for holding circular saws for the purpose of jointing, setting, and filing the same; and it consists more especially in providing a saw arbor or mandrel with journal-bearings at one end, between which are located means for rotating the saw-clamp, which clamp consists of a cone, which is provided at its apex with a shaft which is screw-threaded at its end, and with a corresponding hollow cone and shaft or sleeve, as will be hereinafter set forth, and pointed out in the claim.

In the annexed drawings, Figure 1 is a longitudinal section, and Fig. 2 is a side view, of the arbor with the sleeve or cover removed.

In the annexed drawings, A represents a cone, which is provided at its apex with a shaft, A', having on its end a shoulder and screw-threaded portion, $a$. The opposite end or base of the cone is provided with a shaft, $b$, upon which is formed or located a pulley, $b'$, or other means for rotating the arbor or mandrel. The portion of the shaft $b$ on each side of the pulley forms journals, which rest in bearings on a suitable frame. C represents a corresponding hollow cone and shaft, which fits over the cone A and shaft $b$, as shown. This hollow shaft or sleeve is of less length than the inner shaft, A'. When it is desired to clamp a saw upon this arbor the hollow cone or sleeve is removed, and the eye or central opening of the circular saw is placed over the shaft A', so as to rest upon the face of the cone, as shown in Fig. 1. The hollow cone or sleeve is then replaced, the end of the same pressing upon the face of the saw. The sleeve of the shaft is then washered up until the washers abut against the nut on the end of the shaft A'. The nut is then tightened until a sufficient pressure is exerted upon the sleeve C to jam the saw upon the cone A, the sleeve pressing and holding the same firmly in place.

It will be noticed that with this device saws having eyes of different sizes, from the diameter of the shaft A' to the greatest diameter of the cone A, may be held firmly in place, and that there are no complex parts to get out of order.

Thus having described my invention, what I claim as new, and desire to secure by Letters Patent, is—

In a device for clamping circular saws, the cone A, having shaft A', with screw-threaded end, and end bearings formed of a single piece of metal, in combination with the hollow cone C, terminating in a sleeve, and nut $a'$, substantially as shown, and for the purpose set forth.

In testimony whereof I affix my signature in presence of two witnesses.

THEODORE N. HACKET.

Witnesses:
SAML. C. HYDE,
W. W. DICKINSON.